March 23, 1954    C. E. McCORMICK    2,672,923
VEHICLE SEAT
Filed March 18, 1952                                     8 Sheets-Sheet 1
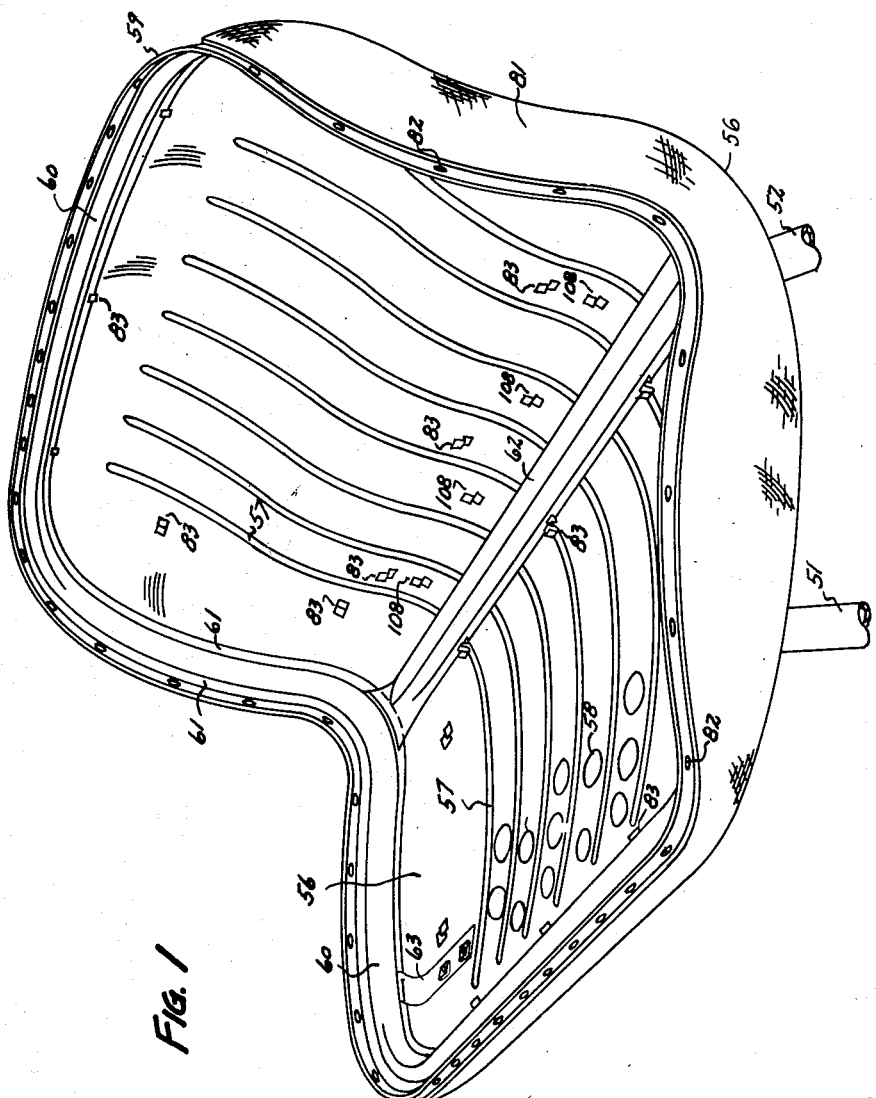
INVENTOR.
CHARLES E. McCORMICK
BY
Barnes, Kissell, Laughlin & Raisch March 23, 1954    C. E. McCORMICK    2,672,923
VEHICLE SEAT
Filed March 18, 1952    8 Sheets-Sheet 2
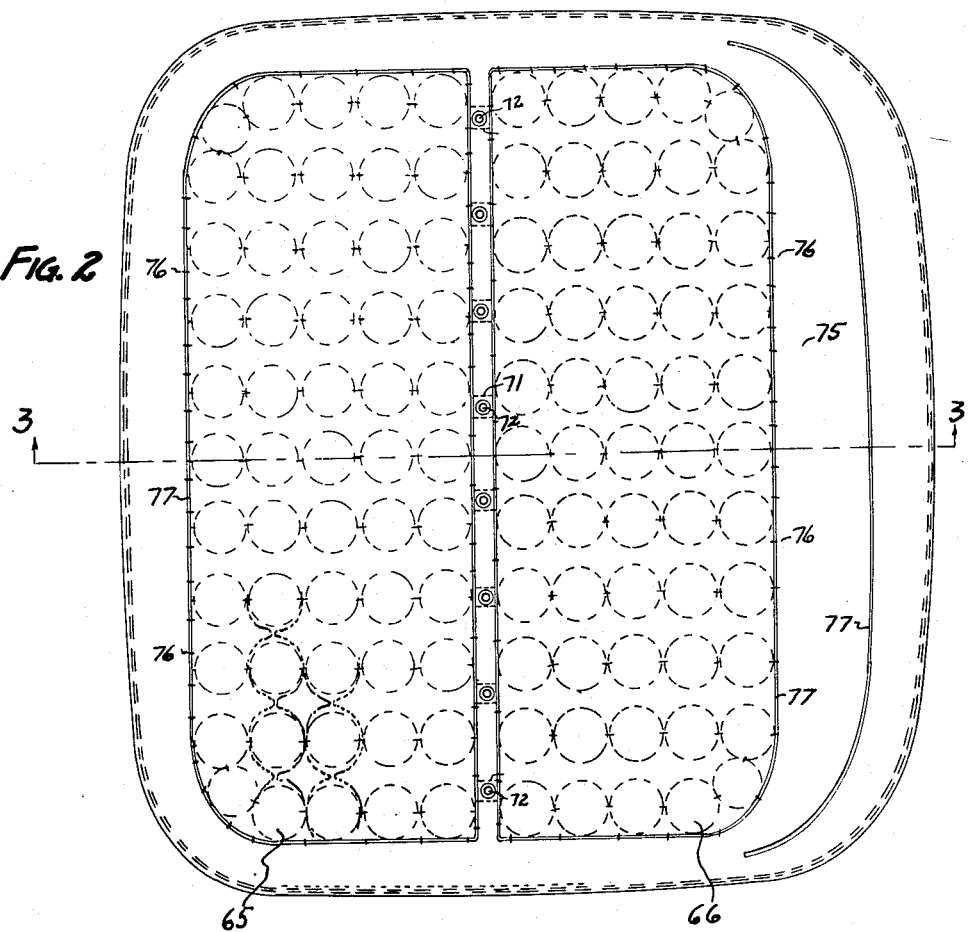
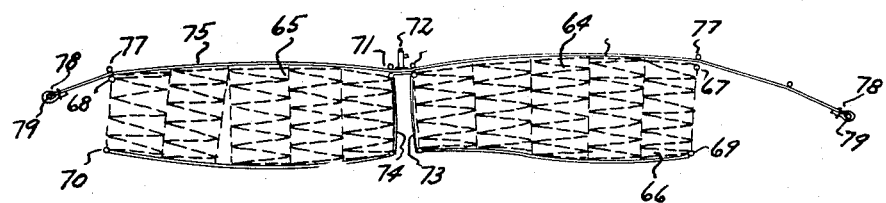
INVENTOR.
CHARLES E. McCORMICK
BY
Barnes, Kisselle, Laughlin & Raisch

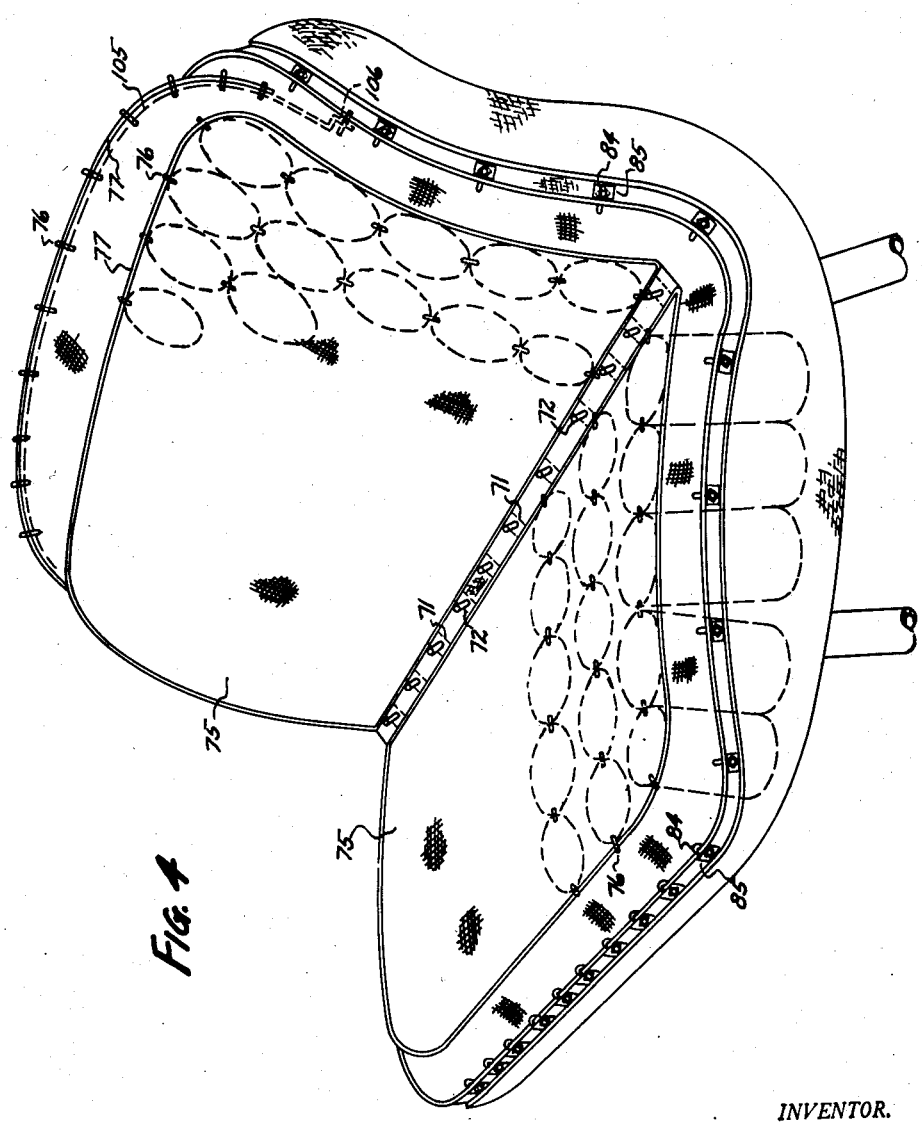

March 23, 1954    C. E. McCORMICK    2,672,923
VEHICLE SEAT
Filed March 18, 1952    8 Sheets-Sheet 4
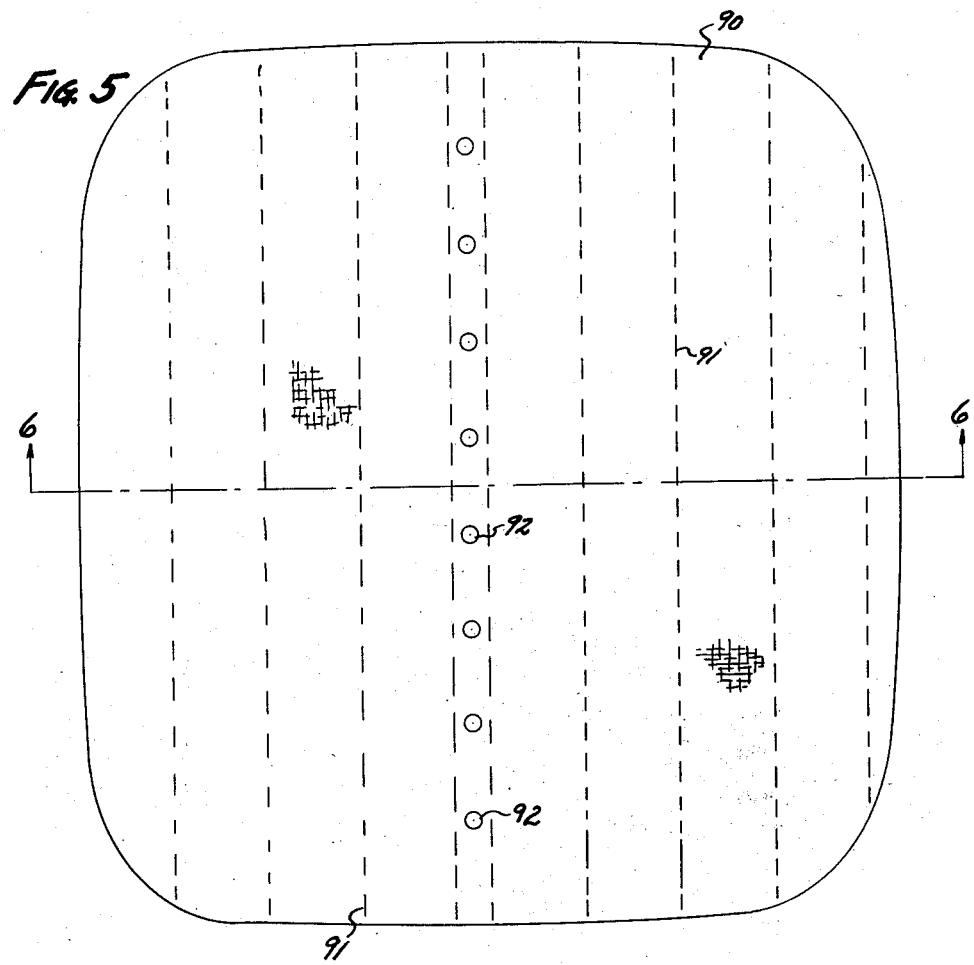
INVENTOR.
CHARLES E. McCORMICK
BY
Barnes, Kisselle, Laughlin & Raisch March 23, 1954  C. E. McCORMICK  2,672,923
VEHICLE SEAT
Filed March 18, 1952  8 Sheets-Sheet 5
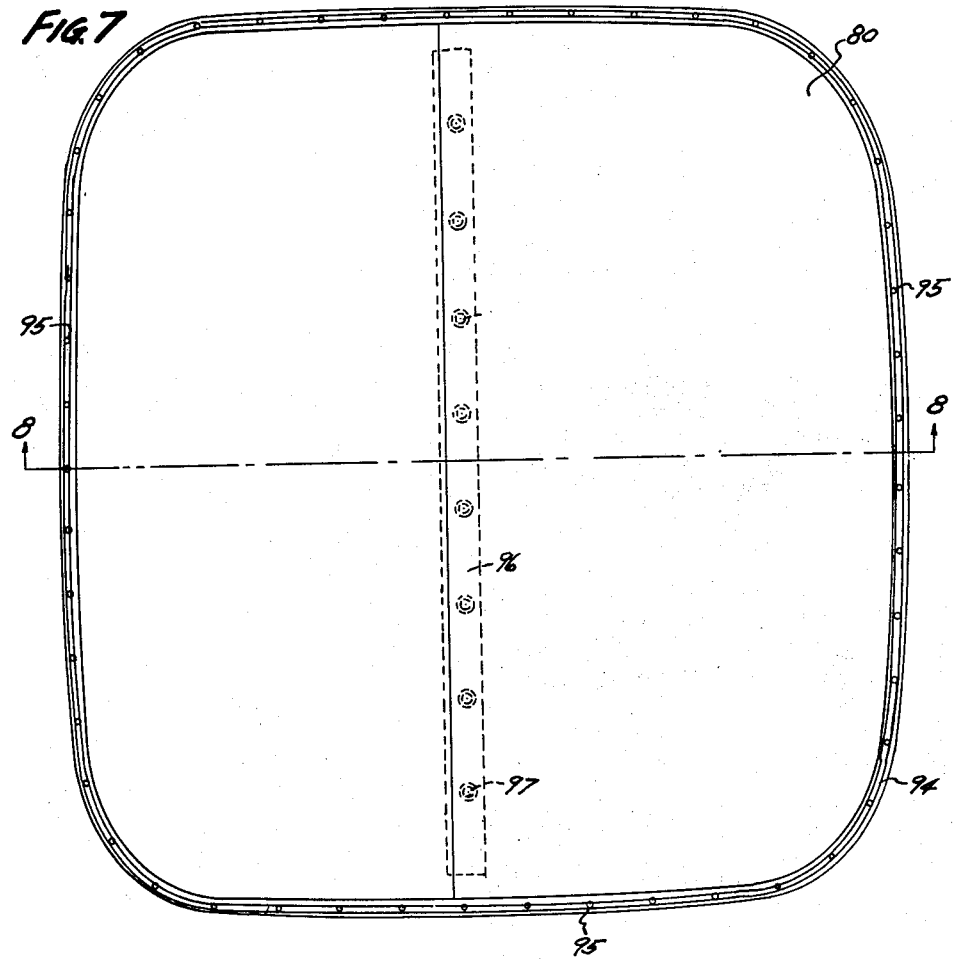
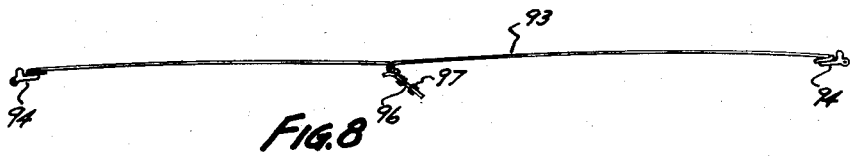
INVENTOR.
CHARLES E. McCORMICK
BY
Barnes, Kisselle, Laughlin & Raisch

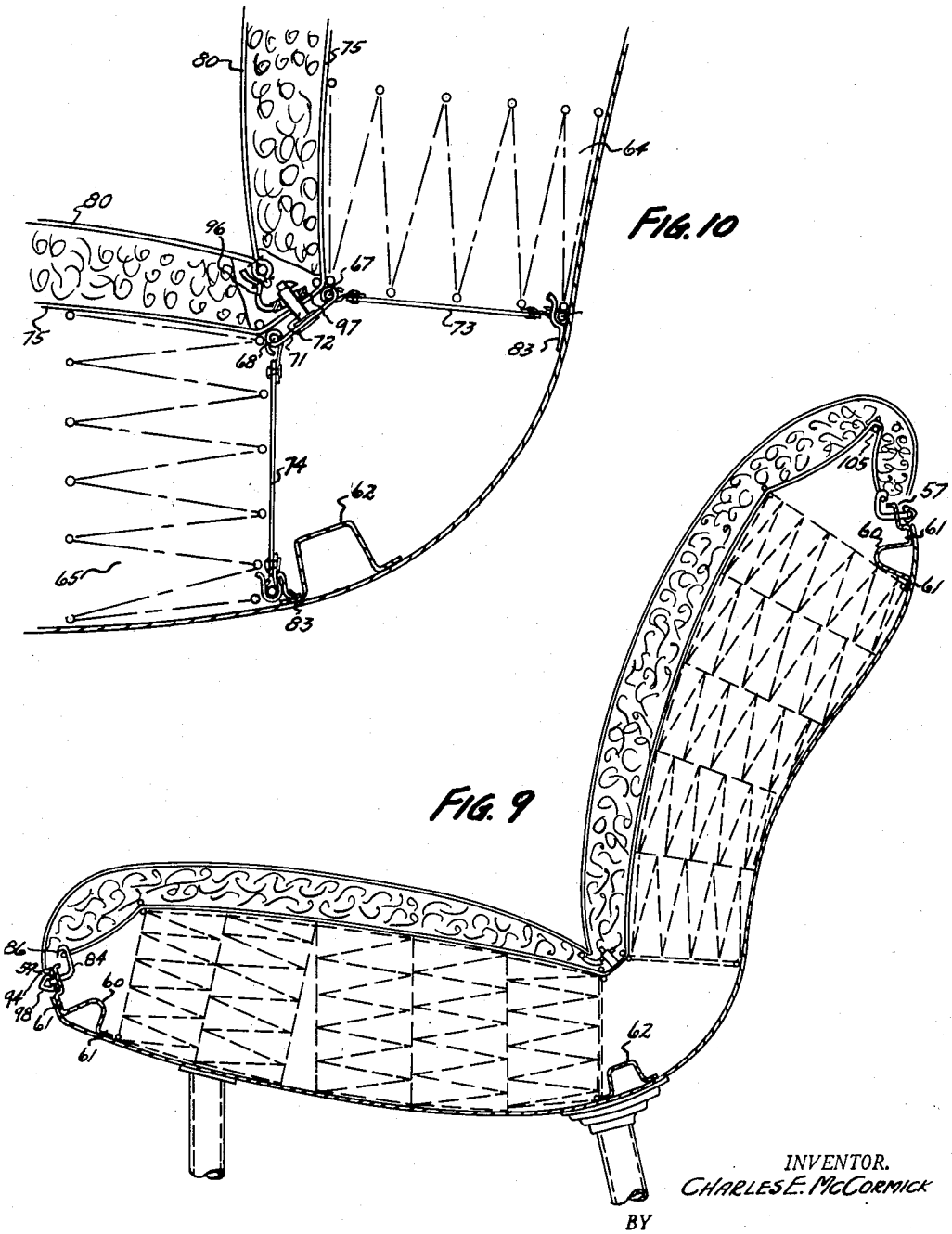

March 23, 1954   C. E. McCORMICK   2,672,923
VEHICLE SEAT
Filed March 18, 1952   8 Sheets-Sheet 7
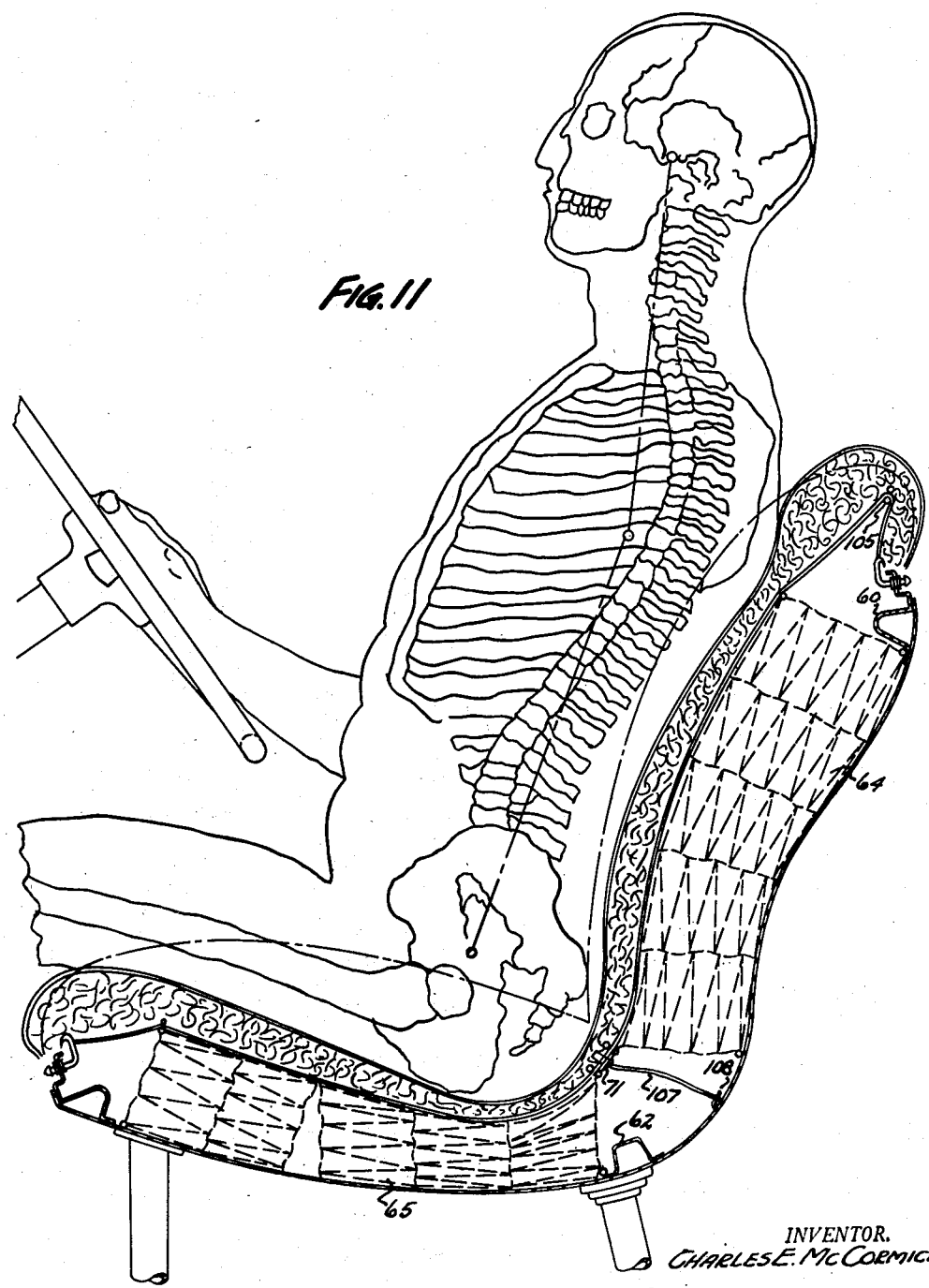
INVENTOR.
CHARLES E. McCORMICK
BY March 23, 1954  C. E. McCORMICK  2,672,923
VEHICLE SEAT Filed March 18, 1952　　　　　　　　　　　　　8 Sheets-Sheet 8

INVENTOR.
CHARLES E. McCORMICK
BY
Barnes, Kisselle, Laughlin & Raisch

Patented Mar. 23, 1954

2,672,923

UNITED STATES PATENT OFFICE 2,672,923

VEHICLE SEAT

Charles E. McCormick, Dearborn, Mich.

Application March 18, 1952, Serial No. 277,231

17 Claims. (Cl. 155—179)

This invention relates to vehicle seats, and more particularly to seat frames, seat spring structures, adjustable seat supports, trim moldings, and trim fastening means.

I have discovered that a vehicle seat provides the most comfortable support when it retains and resiliently supports the human body in a natural sitting position, without undue distortion of the natural contour of the spinal column. In this position most of the body weight is carried at the bottom and back of the pelvis, the area of which is but a few square inches. Therefore the maximum support should be provided in this area. The center of gravity of the body is above the pelvic area and the greater portion of the body weight is transmitted to the pelvic area by the spinal column which is flexible and, unless properly supported laterally, will weave in all directions, thereby causing fatigue and injurious effects. The spinal column should be particularly supported at the concave portion in the small of the back.

In seats as heretofore constructed there is a hollow spot of non-support at the joint between the back and bottom cushions where continuous support is most needed for the back and bottom of the pelvis. In addition, the support provided is relatively rigid and non-yielding due to rigid rims and relatively rigid diagonal braces in the spring structure. This construction causes the pelvis to slide forward away from the back cushion and leaves the back of the pelvis with little or no support. As the muscles of the back become fatigued the naturally concave portion of the spinal column gradually slumps toward the rear causing injurious effects. In that unnatural position, the stomach and other abdominal organs are compressed and misplaced, and the head and shoulders are thrown forward off balance thereby causing excessive strain in the neck muscles.

To eliminate the foregoing objectionable features of present seat construction, this invention provides a continuous and resilient supporting surface over the entire cushion structure by connecting the back and bottom spring units along their intersection line, eliminating the rigid diagonal braces, and substituting therefor flexible tension members to hold the spring surface along this line. Just above this line the spring coils supporting the concave small of the back are pushed forward and shortened by shaping the supporting pan approximately parallel to the concave body. This allows the use of lighter gage wire in these coils and results in a more comfortable but positive support for this area. When the small of the back is properly supported, the weight of the head and shoulders are balanced with a minimum of strain on the neck muscles, the stomach and other abdominal organs are not compressed, and fatigue is greatly lessened.

In seats as heretofore constructed, the bottom pan is usually flat with long coils of relatively heavy gage wire at the front edge where little support is needed, and shorter coils of lighter gage in the rear portion where the most support and the greatest depth of cushion is needed. To correct this trouble, my invention provides a curved seat pan approximately paralleling the buttocks and legs which permits the use of short coils of light gage at the front edge and relatively long coils of medium gage at the rear where the greatest depth of cushion is needed.

It is therefore an object of this invention to provide a seat which supports the body in its natural sitting position by providing a seat pan or spring base formed in a smooth contour which is generally parallel to the contour of the body. With the base surface shaped in this manner, the spring coils may be designed and located so that when compressed by the body the compressed length is substantially the same for all of the coils thereby resulting in a better and more stable ride.

In addition to supporting the body in a natural and comfortable sitting position, a seat should be sufficiently resilient to absorb road shocks with a minimum transmission of the shocks to the body, and the cloth covered surface supporting the body should be freely resilient throughout the amplitude of movement of the body occurring when the shocks are absorbed. Seats as heretofore made have spring units built with the object of being self contained structures with little or no dependence on the seat frame for lateral stability of the spring coils. The group of coils is usually edged by a stiff wire top rim reinforced with arches and braced with rigid diagonal struts so as to maintain the outer edge of the cushion in about the same rigid non-yielding contour both while the seat is free of weight and when the seat is compressed by sitting thereon. When supporting the body, the cloth covering is unduly stretched and carries part of the load in hammock fashion. This action restricts the movement of the spring coils resulting in erratic non-predictable results and an unsatisfactory ride, as well as causing the cloth to become baggy and unsightly.

To improve the foregoing, this invention provides a seat of improved riding qualities and greater resilience with an entirely different spring structure involving among other features, the connecting of the spring coils to the edge of the seat frame, mainly for the purpose of lateral control and stability of the coils, and at the same time allowing them to be freely compressed and decompressed. Instead of using a heavy edge rim to secure the spring coils in a group, this invention uses a light flexible rim, to which is attached a fabric spring cover which covers the coils and forms the resilient supporting surface. The spring cover is extended beyond the edge rim and downwardly where it is connected to the upturned edge of the seat pan. With the use of a spring cover in this manner to eliminate the customary diagonal braces, I have found that the riding qualities are greatly improved.

Among the other objects of my invention is the provision of novel means for fastening the cloth trim cover to the seat frame so that it may be easily and quickly removed for cleaning and may be replaced with equal facility, there being no specialized skill required for these operations.

Other objects and advantages in the way of construction will become evident upon reading the following description in conjunction with the following drawings in which:

Fig. 1 is a perspective view of a seat frame of my construction with legs and adjustable sliding supports attached.

Fig. 2 is a plan view of the spring cover and spring unit sub-assembly as utilized in my invention.

Fig. 3 is a sectional view taken along line 3—3 in Figure 2.

Fig. 4 is a perspective view of the seat frame with the spring unit and spring cover secured therein.

Fig. 5 is a plan view of the cotton pad used to cover the spring cover and spring unit.

Fig. 6 is a sectional view taken along line 6—6 in Fig. 5.

Fig. 7 is a plan view of the trim cover assembly.

Fig. 8 is a sectional view taken along line 8—8 in Fig. 7.

Fig. 9 is a vertical sectional view of the completely assembled seat.

Fig. 10 is an enlarged sectional view of the seat construction at the mid-line between the back and bottom spring units.

Fig. 11 is a cross section of the seat similar to Fig. 10 except that it shows the seat compressed and supporting the human body.

Figure 12:
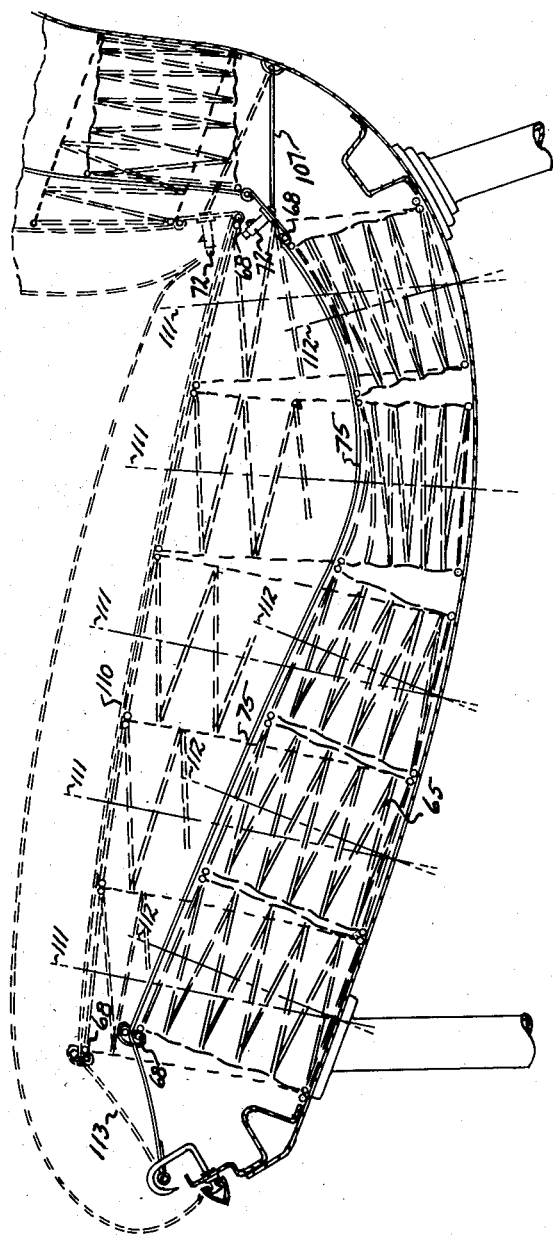
Fig. 12 is an enlarged fragmentary sectional view of a seat similar to that illustrated in Fig. 10 and showing the seat in the compressed and uncompressed condition.

The frame of the seat as shown by Figure 1 comprises a seat pan 56 preferably stamped from a single piece of sheet metal so as to conform generally to the body contour in sitting position. Formed integrally therewith are reinforcing beads 57 and air openings 58. As shown more clearly in Fig. 9, it will be noted that no forming operations are required along the edge of the pan to provide securing means for the fabric. I have found it more economical to form the securing means as an offset flange 59 on channel members 60, which are spot welded at 61 along the peripheral edge of the pan thereby forming a continuous annular closed tubular section for reinforcement. Another channel member 62 extends transversely of the pan and is spotwelded thereto, each end being spotwelded to the channel members 60. Further reinforcement is obtained by securing reinforcements 63 to the pan and to the members 60. It will be seen that a seat frame so constructed will be very rigid as well as being of relatively light weight, and may be constructed in an economical manner.

Front legs 51 and rear legs 52 are secured to the bottom of the pan and positioned so that the front legs 51 may be bolted or otherwise secured to the reinforcements 63 and the rear legs 52 secured to the reinforcement 62. By securing the legs in this manner they are retained very rigidly in place, which is necessary for support of the seat and passengers.

Referring to Figs. 2 and 3 which show the sub-assembly of the spring units and fabric spring cover before installation in the seat frame, the back and bottom spring units 64 and 65 respectively comprise groups of individual coils 66 secured to each other, edged on the top by light wire rims 67 and 68 and on the bottom by rims 69 and 70. Top rims 67 and 68 are joined along their adjacent side by several sheet metal connectors 71 on each of which is mounted a plunger type stud fastener 72, the function of which will be described later. Several flexible tension members 73 tie down rims 67 to bottom rim 69 along the inner side only. In like manner several tension members 74 tie down top rim 68 to bottom rim 70. A fabric spring cover 75 covers the top surface of both groups of coils and is joined to the top rims 67 and 68 by hog rings 76 which encircle the rims and paper cord 77 which is sewed to the cover along the contour of the rims. The peripheral edge of the cover is hemmed as at 78 and a wire stiffener 79 is inserted therein.

After cloth covering 81 is cemented to the exterior of the seat pan (Fig. 1) and slotted at holes 82, the sub-assembly of spring unit and cover shown in Figure 2 can be readily installed in the seat pan. The spring units are retained in place by tabs 83 which engage the bottom rims thereof. Trim fasteners 84 are inserted in and engaged with the slotted holes 82 and the wired edge of the spring cover 75 is engaged with the pointed hook 86 of the fasteners 84 resulting in the assembly shown in Fig. 4.

In Figs. 5 and 6, there is shown a pad 90 which overlies the spring cover. It is composed of the usual cotton covered with cheese cloth on both sides, with stitching 91 and is provided with holes 92 spaced to correspond with studs 72 (Fig. 2).

The trim cover assembly 80 shown in Figs. 7 and 8 comprises a fabric 93 to the peripheral edge of which is sewed a flexible edging strip 94 which is provided with holes 95 spaced to correspond with trim fasteners 84. The edging strip is made of a material not attacked by cleaning fluids, preferably extruded Vinylite plastic, so that the trim cover may be removed from the seat and dry cleaned by ordinary methods. Along the mid-section of the cloth a fabric strip 96 is sewed having metallic grommets 97 which are spaced to correspond with studs 72.

The first step in assembling the pad 90 and trim cover 80 to the foundation of Fig. 4 consists in laying on the pad with holes 92 overlying the studs 72. The grommets 97 of the trim cover are then engaged with the studs 72 which project through the holes 92, thereby securing all of these parts in correct relation for easy attachment of the peripheral edges of the trim cover to the edges of the seat frame which is accomplished by engaging the holes 95 of the plastic edging strip 94 with the projecting heads of corresponding fasteners 84. Then a finish molding 98 is snapped into engagement with the heads of fasteners 84. Prior to fastening of the trim cover, it is desirable to secure the edges of the pad 90 in place by hooking the cheese cloth to the pointed hooks 86 of the fasteners 84.

A softly resilient support for the shoulders is attained by the provision of an auxiliary U-shaped rim 105 (Figs. 4 and 9) which is pivotally supported on the rigid seat frame as at 106 rather than being attached to the rim of the spring unit as in ordinary seats. By pivoting this rim on the seat frame, greater individual freedom of movement for this part is attained without hindering the flexibility of the back spring unit 64, and a very soft and light support for the shoulders is provided.

In connection with the spring assembly it should be noted that the first two rows of coils in the bottom unit 65 are spaced forwardly, at the bottom. As shown most clearly in Fig. 11, they are positioned in this manner so that the weight on the coils will be transmitted in a direction normal to the contour of the seat pan in this area. In Fig. 11 there is also shown an optional method of securing the spring assembly to the seat pan. In this figure the flexible tension members 73 and 74 between upper and lower rims at the mid-section of the seat, as shown in Fig. 3, have been replaced by flexible tension members 107 which extend from sheet metal connectors 71 to clips 108 secured at the rounded midportion of the seat pan.

In Fig. 12 there is shown a seat arrangement generally similar to that illustrated in Fig. 11 except that in Fig. 12 the two rear rows of coils in the bottom unit are spaced apart at the bottom. The contour assumed by the spring cover 75 when the seat is not loaded is indicated by the broken lines 110, the contour of the spring cover when the seat is occupied (springs compressed) being shown in solid lines. When a load is applied to the seat, the springs are depressed and the spring cover 75, being connected with the light flexible top rim 68 around the edge of the seat, maintains the linear distance along the cover between opposed runs of rim 68 constant. Thus, as a load is imposed on the seat, the opposed runs of rim 68 shift inwardly toward each other from the position shown in broken lines to that indicated in solid lines. The upper ends of the coils, being hog ringed together as shown in Figs. 2 and 4, maintain the same spacing in the loaded or unloaded condition. Thus since the opposite runs of rim 68 are drawn inwardly towards each other when the seat is loaded, the axes of the springs are shifted from the positions indicated at 111 to the positions indicated at 112, in which latter positions it will be noted that the axis of each coil is substantially perpendicular to contour of the supporting surface of the seat in the region of each coil. It will be appreciated, of course, that this arrangement will produce a very comfortable ride, it being well known that a coil spring is more stable and possesses greater resilience when the load on the coil is applied in a direction parallel to the axis of the coil.

It will be observed that since the trim cover 75 is extended over top rim 68 and then downwardly and outwardly to the edge of the seat pan 56, the top rim 68 is free to move inwardly under the influence of a load on the seat without restriction from cover 75. The edge portion of cover 75 simply shifts from the position indicated in broken lines at 113 to the position shown in solid lines. Thus the cover provides the necessary lateral stability for the coils without the use of rigid diagonal braces which are conventionally used to provide the necessary stability. At the same time this arrangement permits the spring coils to operate freely when loaded.

The extent of inclination of the edge portion of cover 75 between the top rim 68 and hook 84 is not critical. However if the angle of inclination is too great the lateral support afforded by the cover is negligible and if the angle of inclination is too small then it will be appreciated that insufficient fabric is provided to permit the runs of rim 68 to move freely inwardly under a load, and a greater portion of the load will be supported by the spring cover which in turn causes the spring cover and the fabric of the trim cover to stretch and become unsightly. It has been determined through tests that an angle of inclination between 30° and 60° lies within the satisfactory range. Thus, within this range of angles it will be observed that the inclined portion of the cover 75 exerts a pull on the top rim which has a lateral component of at least one half the vertical component of the pull on the top rim.

This application is a continuation in part of my co-pending application Serial No. 705,390, filed October 24, 1946, now abandoned.

I claim:

1. In a vehicle seat in combination, a base having a substantially vertical rigid supporting surface and a spring unit mounted thereon having a resilient spring surface, and a substantially horizontal rigid supporting surface and a spring unit mounted thereon having a horizontal resilient supporting surface, means forming a nonyielding connection between said two resilient supporting surfaces along a midline therebetween and having spaced fastening means thereon, flexible tension members connecting said connecting means to said rigid supporting surface, a pad overlying said spring units and a trim cover extending continuously over said pad having fastening means positioned thereon to correspond with the fastening means on said spring units.

2. In a vehicle seat a base having rigid vertical and horizontal supporting surfaces, spring units mounted on said rigid surfaces comprising a plurality of coil springs joined together and edged by flexible rims at the top and bottom edges thereof, a resilient U-shaped auxiliary rim secured at each side of said vertical rigid surface extending around upper portion thereof, and a fabric cover extending over said spring units secured to said top and auxiliary rims and attached to the edge of said base whereby said auxiliary rim may be resiliently pivoted on said base without restriction of said spring units.

3. In a vehicle seat in combination, a base having substantially vertical and horizontal surfaces, fastening means spaced along the peripheral edge of said base, spring units mounted on said base and joined along the midline between said vertical and horizontal surfaces, spaced fastening means secured to said spring units along said midline, a pad overlying said spring units, and a trim cover extending continuously over said pad and having fastening means positioned thereon to correspond and engage with the fastening means on said springs and on said base and thereby provide a continuous resilient supporting surface, said fastening means being of the detachable type to permit easy removal and replacement of the trim cover.

4. In a vehicle seat the combination of a base having a substantially vertical supporting surface and a substantially horizontal supporting surface, a spring unit mounted on each of said supporting surfaces with the lower edge of the spring unit on the vertical supporting surface adjacent the rear edge of the spring unit on the horizontal supporting surface, fastening means spaced around the edge of said base, fastening means positioned between said adjacent edges of said spring units and forming a non-yielding connection therebetween, a trim cover extending continuously over both said vertical and horizontal spring units, said trim cover having its peripheral edge engaged by the spaced fastening means around the upturned edge of said base and flexible tension members secured to said trim cover along a line corresponding to the midline between said adjacent edges of said spring units, said tension members having fastening means thereon engaged with the fastening means between said spring units, the coil springs of said spring units being selected and positioned so that the portion of said trim cover extending over each of said spring units is provided with a convex contour, said tension members being dimensioned and positioned to pull the trim cover downwardly in the direction of said adjacent edges to maintain said convex contour and to provide slack in said trim cover which, when the seat is occupied, permits the trim cover to assume a generally concave contour in the region of said adjacent edges.

5. In a vehicle seat in combination, a base having substantially vertical and horizontal surfaces, fastening means spaced along the peripheral edge of said base, spring units mounted on said base and joined along the midline between said vertical and horizontal surfaces, spaced fastening means secured to said spring units along said midline, a pad overlying said spring units, and a trim cover extending continuously over said pad and having fastening means positioned thereon to correspond and engage with the fastening means on said springs and on said base and thereby provide a continuous resilient supporting surface.

6. In a vehicle seat in combination, a rigid base member having upturned edges, a plurality of coil springs mounted on said base member and secured to each other to form a spring unit having a supporting surface, said unit being edged by a light flexible wire rim, said rim being offset inwardly of and in a plane above said upturned edges, and a cover for said spring unit secured to said rim, extending angularly downward and outwardly therebeyond and joined to said upturned edges to permit said spring unit to be freely compressed by a person sitting thereon without undue restriction of said spring cover, said angularly extending portion of said cover being inclined to the supporting surface of said springs so that the component of force exerted by said angularly extending portion of said cover on said rim in a direction laterally of said supporting surface is at least one half the component of force exerted by said angularly extending portion of said cover on said rim in a direction normal to said supporting surface.

7. In a vehicle seat a plurality of helical springs mounted on a base structure, a top rim, and a fabric spring cover, the tops of said springs being joined together, edged by said top rim, and covered by said cover to form a top surface, said top rim being disposed above and inwardly of the edge of said base structure, said cover being pulled taut out beyond and below said top rim and attached to the edge of said base structure, the portion of said cover extending beyond said top rim being inclined downwardly at an angle to said top surface of between 30° and 60°.

8. In a vehicle seat, a sheet metal frame comprising a rigid supporting surface having upwardly extending edges, a cushion spring unit comprising a plurality of helical springs, and a fabric cover, the bottoms of said springs being joined together and seated on said rigid supporting surface, the tops of said springs being joined together and covered by said fabric cover to form a resilient supporting surface, the edges of said cover being extended downwardly and outwardly from said resilient surface at an angle of between 30° and 60° and attached to the upwardly extending edges of said frame, whereby said resilient supporting surface may be freely and resiliently depressed, the inclined edges of said cover serving to support said spring unit in a lateral direction and to permit the axes of said spring to tilt away from the edges of said frame when loaded.

9. In a vehicle seat the combination of a base, a group of springs mounted on said base to provide a resilient supporting surface, means connecting said springs together to form a spring unit, a flexible rim member extending around the periphery of said spring unit and connected with the springs of said group around the upper edge of said spring unit, and means for holding said springs in an upright position on said base comprising a flexible tension member connected with said rim member and extending outwardly and downwardly to said base, said flexible member being inclined downwardly from said rim at an angle of between 30° and 60° whereby the lateral component of the force exerted by said tension member on said rim is not less than approximately half the vertical component of the force exerted by said tension member on said rim.

10. In a vehicle seat the combination of a base having an upwardly turned peripheral edge, a plurality of coil springs mounted on said base and forming a generally rectangular spring unit, a flexible rim member connected with said springs around the upper peripheral edge of said unit, and means for holding said springs in an upright position on said base comprising flexible tension means connected with said rim member around at least three sides of said spring unit and extending outwardly and downwardly from said rim member to said base, said tension means being inclined downwardly from said rim at an angle of between 30° and 60° whereby said tension means exert a lateral force on said rim member at least one half as great as the vertical force exerted by said tension means on said rim member.

11. In a vehicle seat the combination of a base having a rigid vertical and horizontal supporting surface, spring units mounted on said rigid supporting surfaces, said spring units each comprising a plurality of coil springs joined together and edged by a flexible rim around the upper peripheral edge of said spring unit, an auxiliary rim secured to said base at each side thereof and extending upwardly and outwardly beyond and freely of said first mentioned rim, and a flexible tension member extending between and connecting said flexible top rim with said auxiliary rim along a longitudinal edge of said seat.

12. In a vehicle seat the combination of a base, a spring unit mounted on said base, said spring unit comprising a plurality of coil springs joined together and edged by a flexible rim around the top edge thereof, a resilient U-shaped auxiliary rim connected to said base at corresponding points adjacent each end of said spring unit and extending outwardly beyond said flexible top rim of said spring unit along a line spaced between the upper and lower edges of said spring unit, and flexible tension means extending from said top rim over said auxiliary rim and secured to said base.

13. A vehicle seat comprising a base, a cushion spring unit on said base comprising a plurality of coil springs, a flexible wire rim extending around said spring unit and connected with the upper ends of the coils around the periphery of said spring unit, means forming substantially non-elastic connections between the upper ends of the coils in said spring unit, and a fabric cover extending continuously over the upper ends of said coils and connected with said flexible top rim.

14. A vehicle seat comprising a base, a cushion spring unit on said base comprising a plurality of coil springs, a flexible wire rim extending around said spring unit and connected with the upper ends of the coils around the periphery of said spring unit, means forming substantially non-elastic connections between the upper ends of the coils in said spring unit, a fabric cover extending continuously over the upper ends of said coils and connected with said flexible top rim, said base extending outwardly beyond the periphery of said spring unit, and flexible means extending downwardly and outwardly from said top rim to the edges of said base.

15. The combination set forth in claim 14 wherein said last mentioned flexible means are inclined downwardly at an angle of between 30° and 60° to the top surface of said spring unit.

16. A vehicle seat comprising a rigid base having a contour generally parallel to that of the human body between the knees and the buttocks in a comfortably seated position, a generally rectangular spring unit on said base comprising a group of coil springs, said group of coil springs being edged around the periphery thereof at the top surface of said spring unit by a flexible wire rim, a spring cover extending continuously over the tops of said coils and said wire rim, means forming substantially non-elastic connections between said cover, the tops of said springs and said rim, whereby the lineal distance between opposite runs of said top rim along the supporting surface of said spring unit remains substantially constant when the coils are compressed, and flexible means extending from said top rim in a direction downwardly and outwardly to the edges of said base, said spring being selected and positioned such that the surface of said spring unit when compressed by the weight of a person seated thereon is generally parallel to said base.

17. A vehicle seat comprising a base, a generally rectangular cushion spring unit on said base comprising a group of coil springs presenting a supporting surface, said group of springs being edged around the periphery of said supporting surface by a flexible wire rim, a spring cover extending continuously over said supporting surface and said wire rim, means forming substantially non-elastic connections between the upper ends of said coils, said spring cover and said wire rim, flexible means extending in a direction outwardly and downwardly from said wire rim to said base, said wire rim, said spring cover and the upper ends of said coils being interconnected by said connection means such that when a load is impressed upon said supporting surface the lineal distance between opposite runs of said wire rim along said supporting surface remains substantially constant and said last mentioned flexible means enable the opposite runs of said wire rim to flex in a direction inwardly of said supporting surface.

CHARLES E. McCORMICK.

References Cited in the file of this patent

UNITED STATES PATENTS

| Number | Name | Date |
| --- | --- | --- |
| 919,201 | Montgomery | Apr. 20, 1909 |
| 1,254,333 | McCullough | Jan. 22, 1918 |
| 2,042,238 | Otto | May 26, 1936 |
| 2,347,617 | Story | Apr. 25, 1944 |
| 2,359,318 | Lay et al. | Oct. 3, 1944 |

FOREIGN PATENTS

| Number | Country | Date |
| --- | --- | --- |
| 494,763 | Great Britain | Nov. 1, 1938 |